Jan. 3, 1956  J. B. KING  2,729,248
BOARD TRIMMING, SORTING AND STACKING APPARATUS
Filed Feb. 24, 1953  7 Sheets-Sheet 1

INVENTOR.
J. B. KING
BY
Jacoby y Jacoby
ATTORNEYS

FIG. 2

INVENTOR
J. B. KING

Jan. 3, 1956 J. B. KING 2,729,248
BOARD TRIMMING, SORTING AND STACKING APPARATUS
Filed Feb. 24, 1953 7 Sheets-Sheet 3

FIG. 3

INVENTOR
J. B. KING
BY
Jacobi & Jacobi
ATTORNEYS

Jan. 3, 1956 J. B. KING 2,729,248
BOARD TRIMMING, SORTING AND STACKING APPARATUS
Filed Feb. 24, 1953 7 Sheets-Sheet 4

INVENTOR.
J. B. KING
BY
Jacobi & Jacobi
ATTORNEYS

FIG. 7

Jan. 3, 1956   J. B. KING   2,729,248
BOARD TRIMMING, SORTING AND STACKING APPARATUS
Filed Feb. 24, 1953   7 Sheets-Sheet 7

INVENTOR.
J. B. KING
BY
Jacobi & Jacobi
ATTORNEYS

United States Patent Office 2,729,248
Patented Jan. 3, 1956

2,729,248

BOARD TRIMMING, SORTING, AND STACKING APPARATUS

John B. King, Forest, Miss., assignor to King Lumber Engineering Company, Jackson, Miss., a partnership Application February 24, 1953, Serial No. 338,418

10 Claims. (Cl. 143—37)

This invention relates to material or article handling and more particularly to an apparatus for cutting boards to predetermined lengths, sorting these boards in accordance with such lengths, further sorting such boards in accordance with the widths thereof, and stacking the boards in separate stacks in accordance with both the length and width.

Heretofore numerous machines have been designed and utilized for this general purpose but such machines have for the most part been relatively unsatisfactory in that the lumber frequently became jammed causing stoppage of the apparatus, the apparatus was unduly large and cumbersome requiring a relatively large installation area which is usually not conveniently available in locations where such apparatus is normally utilized and also these prior machines did not stack the sorted lumber in separate piles according to width and length in such a way that the piles could be moved by fork trucks or other conventional transportation means.

It is accordingly an object of this invention to provide a board trimming and sorting apparatus which requires a minimum of space and which serves to trim, sort, and stack boards in accordance with the width and length thereof.

A further object of the invention is the provision of a board trimming and sorting apparatus in which the trimming means may be conveniently adjusted to provide boards of any desired length, the sorting mechanism operating in its intended manner regardless of the adjustment of such trimming means.

Another object of the invention is the provision of a board trimming and sorting apparatus in which means is incorporated to preclude jamming and stoppage of the apparatus due to misalignment of boards during their travel therethrough.

Another object of the invention is the provision of a board trimming and sorting apparatus including means for stacking such boards in separate piles in accordance with the length and width thereof and further including means for indicating the number of boards stacked in each pile.

A still further object of the invention is the provision of a board trimming and sorting apparatus which may be economically constructed from readily available materials and parts and which operated to automatically accomplish trimming and sorting operations heretofore accomplished manually by several persons.

Further objects and advantages of the invention will be apparent from the following descriptions taken in conjunction with the accompanying drawings, wherein.

Figures 1, 12, 13:
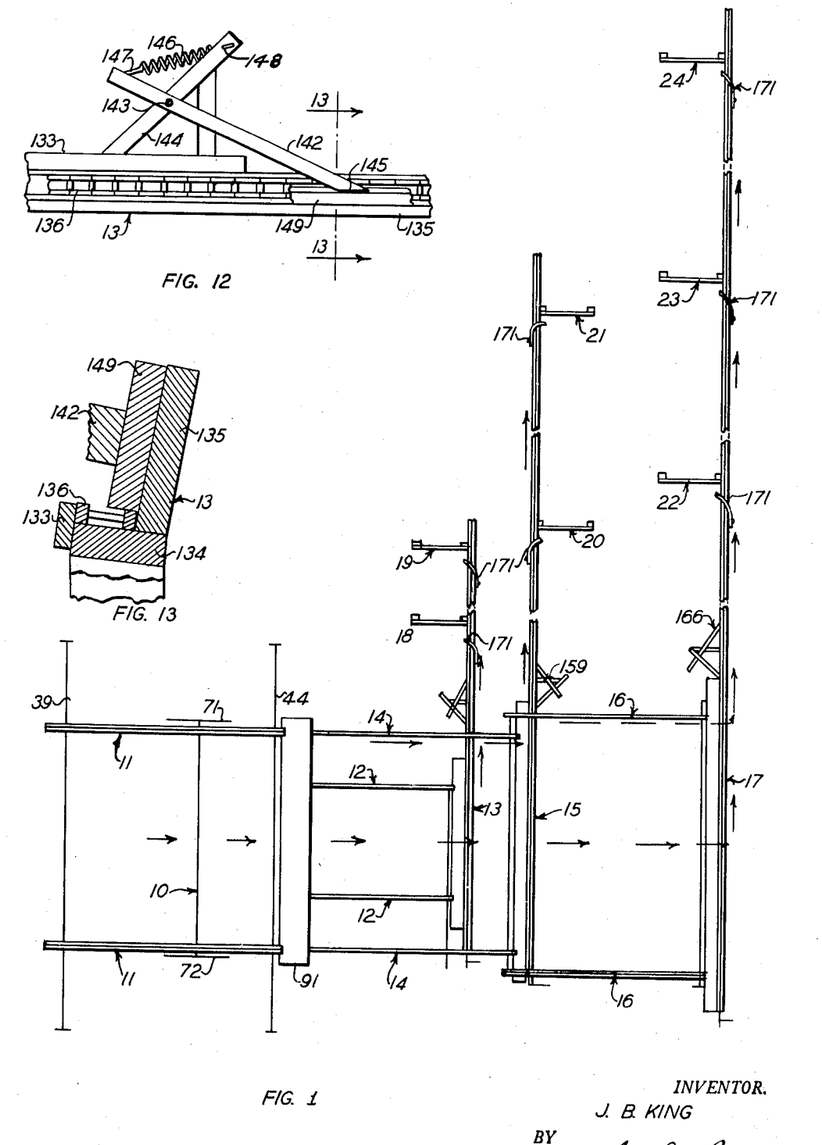
Fig. 1 is a diagrammatic top plan view showing the general layout of the apparatus of this invention.
Fig. 12, sheet 1, a fragmentary top plan view showing the mechanism for orienting the boards in the laterally extending conveyor trough.
Fig. 13, a sectional view on the line 13—13 of Fig. 12.

With continued reference to the drawing there is shown in Fig. 1, a diagrammatic layout of an apparatus constructed in accordance with this invention and including an adjustable board trimming means 10 and conveyors 11 for conveying boards to and away from the trimming means 10. The apparatus as shown in Fig. 1, contemplates the sorting of boards trimmed to three different lengths but obviously the apparatus may be constructed in accordance with the principles of this invention to handle boards of any desired length. Accordingly there is provided conveyor means 12 for receiving the shortest length boards from the trimmer conveying means 11, conveying means 12 depositing such short boards in a laterally extended conveyor trough 13.

Also arranged to receive boards of intermediate length from the trimmer conveying means 11 is a conveyor mechanism 14 which serves to deposit such boards of intermediate length in a second laterally extending conveyor trough 15.

Further conveying means 16 is provided for receiving the longest boards accommodated by the apparatus from conveying means 14 and serves to deposit the same in a third laterally extending conveyor trough 17.

Laterally extending conveyor trough 13 is provided with means to be later described in detail for ejecting boards therefrom into bins formed by partitions 18 and 19 in accordance with the widths of such boards and laterally extending conveyor trough 15 is provided with means for ejecting boards therefrom in accordance with the widths thereof into bins formed by partitions 20 and 21. In a similar manner laterally extending conveyor trough 17 is provided with means for ejecting boards therefrom in accordance with their widths into bins formed by partitions 22, 23 and 24.

While only two bins have been shown associated with the conveyor troughs 13 and 15 and three bins with the conveyor trough 17, obviously any desired number of such bins may be provided within the practical limits of the apparatus and the widths of boards normally provided for commercial use and the number shown on the drawing and described in the specification is for illustrative purposes only.

Likewise while in Fig. 1 the conveyor troughs 13, 15 and 17 have been shown as all extending from one side of the apparatus obviously such troughs may be arranged to alternately stand on opposite sides, or certain of the troughs may extend to one side and others to the opposite side. The arrangement of the troughs will depend to a great extent on the number of lengths and widths of boards to be handled and the space available for installing the apparatus. It is, of course, understood that these various suggested arrangements of the conveyor troughs in no way change the basic principles of the invention, such arrangements being varied for convenience only.

With particular reference to Figs. 2, 4, 5, 6, 8 and 9, the trimming means 10 and associated conveyors 11 may well comprise a relatively long arbor 25 which if desired may be made in two sections connected adjacent the mid-point thereof, by a coupling 26. Arbor 25 may be provided on one end with an elongated keyway 27 and on the opposite end with a similar keyway 28. Arbor 25 may be rotatably supported by bearings 29 mounted on cross members 30 forming part of the frame of the apparatus and supported by legs 31.

Figure 2:
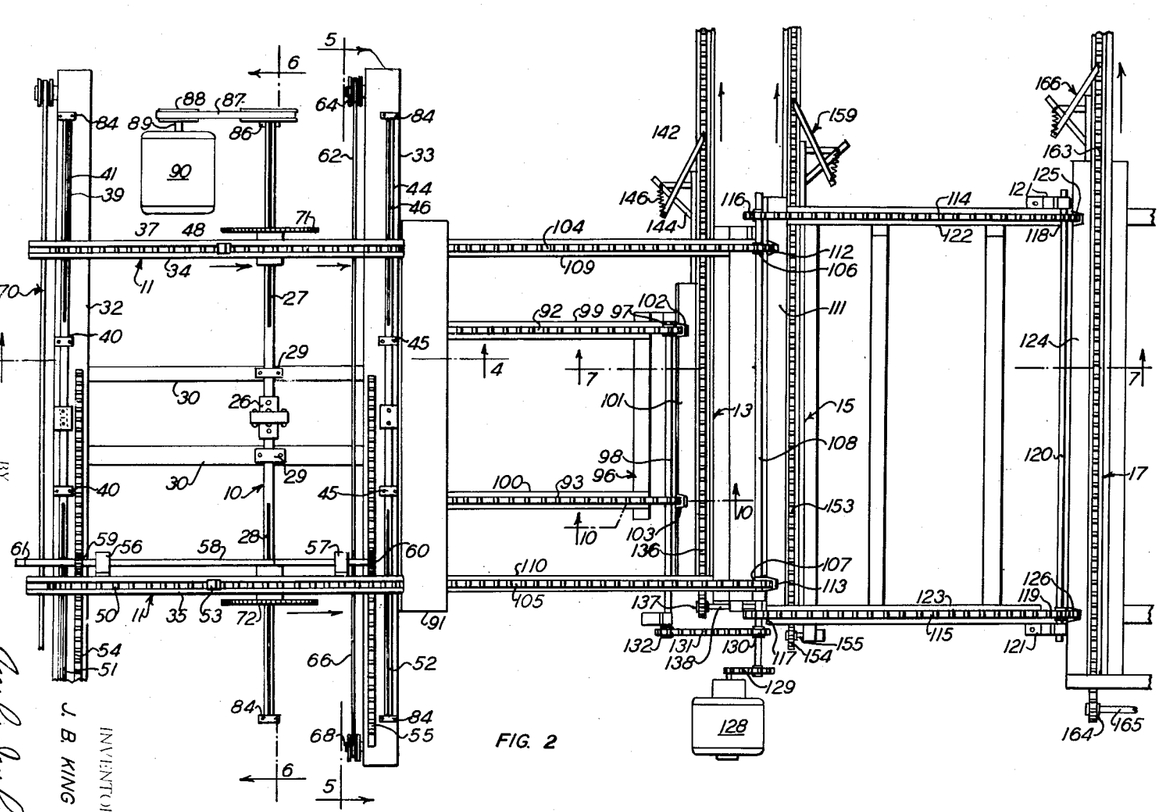
Fig. 2, a fragmentary top plan view showing the portion of the apparatus which serves to trim the ends of the boards and separate them according to length.
Figures 4, 10, 11:
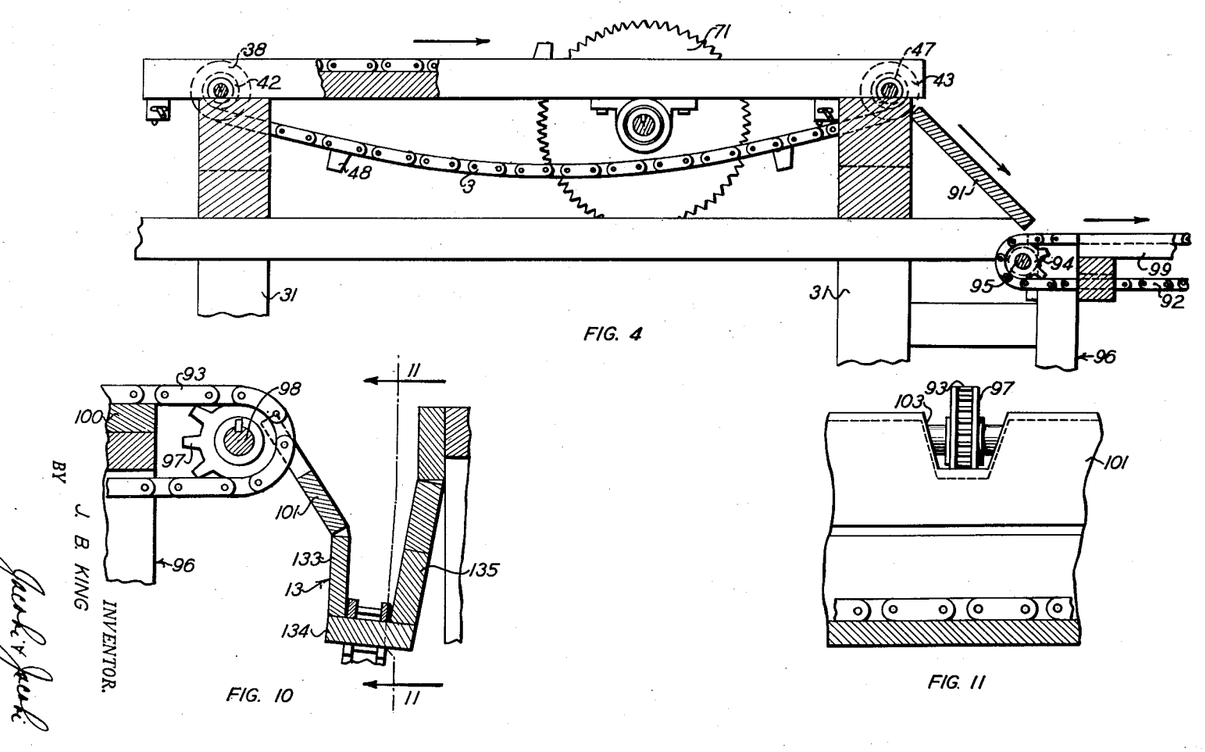
Fig. 4, a fragmentary sectional view on the line 4—4 of Fig. 2, showing the feeding means for the trimming saws as well as the means for delivering the trimmed boards to the conveyors for separating the boards according to length.
Fig. 10, sheet 4, a sectional detail view on the line 10—10 of Fig. 2, showing the delivery conveyor for the boards of shortest length and the laterally extending trough and conveyor for such boards.
Fig. 11, a sectional view on the line 11—11 of Fig. 10.
Figure 5:
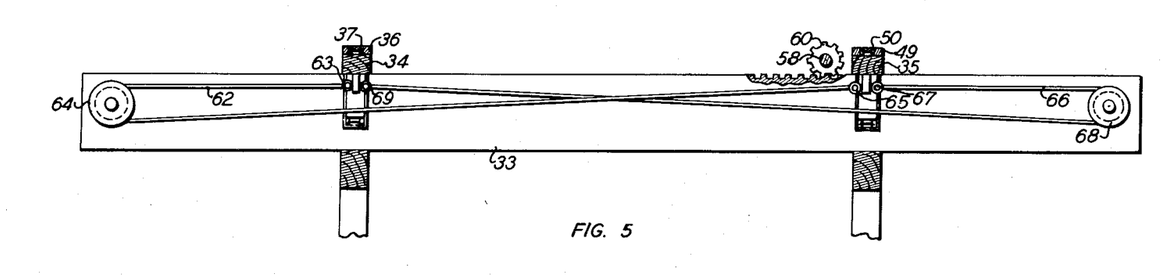
Fig. 5, a sectional view on the line 5—5 of Fig. 2, showing the adjustable board supporting ways and the mechanism for simultaneously moving the same toward and from each other.

Also supported on the legs 31 and extending transversely of the apparatus on spaced, parallel, transverse members 32 and 33 which serve to slidably support spaced parallel board supporting ways 34 and 35. Way 34 is provided in the upper surface thereof, with a groove 36 which serves to receive a conveyor chain 37, this chain at one end being trained over a sprocket 38 slidably received on a shaft 39 rotatably mounted on bearings 40 carried by the transverse member 32. Shaft 39 may be provided with an elongated keyway 41 which serves to receive a key 42 carried by the sprocket 38. The opposite end of chain 37 is trained over a sprocket 43 slidably received on a shaft 44 supported by bearings 45 mounted on transverse member 33. Shaft 44 may be provided with an elongated keyway 46 for receiving a key 47 carried by the sprocket 43. Chain 37 may be provided with a plurality of lugs 48 extending from the outer surface thereof, the purpose of which will presently appear.

Way 35 is also provided with a groove 49 in the upper surface thereof, for receiving a conveyor chain 50, this chain being trained over sprockets received on shafts 41 and 44, these sprockets having keys for engaging elongated keyways 51 and 52 respectively. Chain 50 is provided with lugs 53 which cooperate with lugs 48 on chain 37 in a manner which will presently appear.

Since it is necessary that ways 34 and 35 be simultaneously adjusted toward or from each other in order to support boards of different lengths, means is provided to accomplish this operation in the form of a rack 54 provided on the upper surface of transverse member 32 and a rack 55 provided on the upper surface of transverse member 33. Way 35 is provided on the inner surface thereof, with spaced bearings 56 and 57 which served to rotatably support a shaft 58 upon which is mounted a gear 59 engaging rack 54 and a gear 60 engaging rack 55. Shaft 58 may be provided with a polygonal end 61 for receiving a crank or other suitable means for facilitating rotation of the shaft 58 and consequent movement of the way 35 to the right or left depending upon the direction of rotation of the shaft 58.

In order that way 34 may move simultaneously with way 35 and in the opposite direction there is shown in Fig. 5, means for accomplishing this operation comprising a flexible element such as a cable 62 connected at one end 63 to the way 34 and trained over a pulley 64 rotatably mounted on the transverse member 33, cable 62 being connected at its opposite end 65 to the way 35. A second cable 66 is connected at one end 67 with the way 35 and is trained over a pulley 68 rotatably mounted on the transverse member 33, the opposite end of cable 66 being connected at 69 to the way 34. It will thus be seen from an inspection of Fig. 5, that upon movement of the way 35 in one direction by reason of the rotation of shaft 58 that due to the arrangement of cables 62 and 66 the way 34 will simultaneously move in the opposite direction. A similar cable arrangement 70 is provided adjacent the opposite ends of ways 34 and 35 and thus such ways are maintained in substantial parallelism.

With particular reference to Figs. 2, 6, 8 and 9, opposed trimming saws 71 and 72 are slidably mounted on arbor 25, saw 72 having an elongated hub 73 slidably received on the arbor 25 and having a key 74 received in the keyway 28 to prevent relative rotation between the saw 72 and the arbor 25. Hub 73 is rotatably received in a bearing 75 mounted on the under side of way 35 and a collar 76 received over the hub 73 and secured in place by screw threaded fastening means or the like 77, serves to space the saw 72 from the way 35. The hub 73 and saw 72 carried thereby, is secured against endwise movement relative to the bearing 75 and way 35 by a nut 78 threadedly engaging the hub 73 at 79 and abutting the inner side of the bearing 75. Nut 78 may be locked in adjusted position by screw threaded fastening means or the like 80. Saw 71 may be rotatably mounted on the way 34 by a similar arrangement, this saw being retained against endwise movement in the bearing 81 by a nut 82 locked in adjusted position by screw threaded fastening means or the like 83. If desired, outward movement of the ways 34 and 35 on the arbor 25 and shafts 39 and 44 may be limited by collars 84 adjustably mounted on the ends thereof, by screw threaded fastening means or the like 85.

Figures 6, 8, 9:
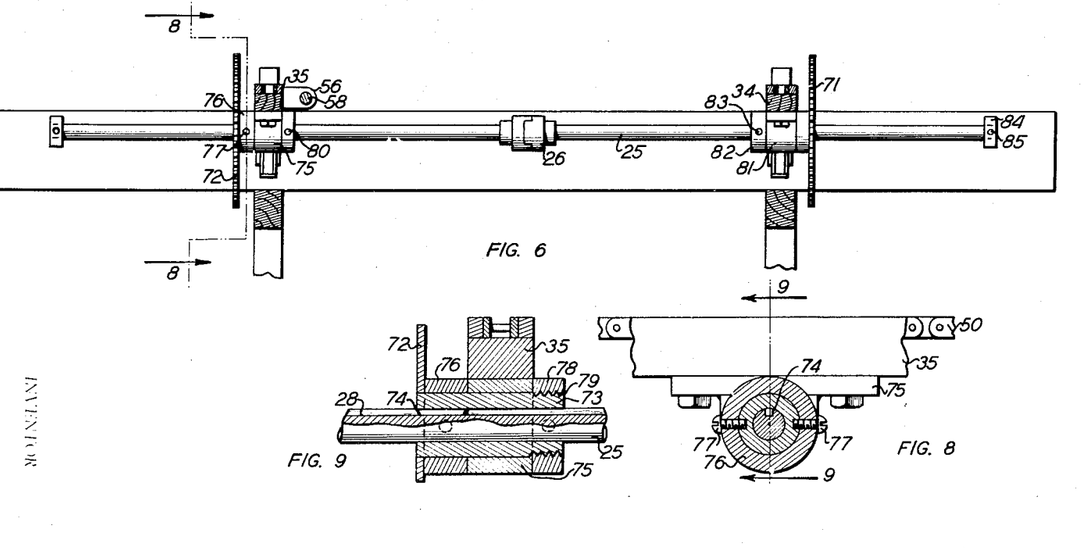
Fig. 6, a sectional view on the line 6—6 of Fig. 2, showing the adjustable trimming saws and the structure which causes movement of the same toward and from each other simultaneously with the movement of the board supporting ways.
Fig. 8, sheet 5, a sectional detail view on the line 8—8 of Fig. 6, showing the manner of mounting the trimming saws on the saw arbor.
Fig. 9, a sectional detail view on the line 9—9 of Fig. 8, showing the slidable mounting of the trimming saws on the saw arbor and the manner of connecting the saws to the board supporting ways for movement therewith.

Arbor 25 and saws 71 and 72 carried thereby may be driven by a pulley 86 fixed on the arbor 25 and engaging a belt 87 which in turn engages a pulley 88 mounted on the power output shaft 89 of a driving motor 90.

Conveyor chains 37 and 50 may be driven by any suitable means but such driving mechanism is not shown since the same is conventional in every respect and the inclusion thereof in the drawing would only tend to confuse the same.

The trimming saws 71 and 72 together with the ways 34 and 35 are set a predetermined distance apart for cutting boards to the desired length by rotation of the shaft 58 which due to the engagement of gears 59 and 60 with the racks 54 and 55 results in moving the ways 34 and 35 as well as the saws 71 and 72 carried thereby toward or from each other to a position where the saws 71 and 72 are spaced apart in accordance with the length of board which it is desired to cut. With the chains 37 and 50 moving a board is placed on the upper surface of the ways 34 and 35 and such board is engaged by the lugs 48 and 53 which serve to advance the same into engagement with the saws 71 and 72 resulting in trimming the board to the desired length. After leaving the saws 71 and 72 the board is delivered from the conveyor chain 37 and 50 onto an inclined ramp 91 and moves downwardly thereon due to the action of gravity.

As best shown in Figs. 2, 4, 7, 10 and 11 spaced conveyor chains 92 and 93 are supported at one end on sprockets 94 carried by a shaft 95 which is rotatably mounted on a framework 96, the opposite ends of chains 92 and 93 being carried by sprockets 97 mounted on a shaft 98 for rotation therewith, shaft 98 also being supported on frame 96. The upper runs of chains 92 and 93 are supported on rails 99 and 100, such rails being supported by the framework 96. An inclined ramp 101 is disposed adjacent the delivery ends of chains 92 and 93 and notches 102 and 103 are provided in the upper edge of the ramp 101, these notches 102 and 103 serving to receive the sprockets 97 and chains 92 and 93 respectively carried thereby. Boards of the shortest length to be handled by the apparatus are delivered from the conveyor chains 37 and 50 to the ramp 91 from which such boards are deposited on the conveyor chains 92 and 93. These chains in turn deposit the boards on inclined ramp 101 from which by gravity the boards move downwardly in an edgewise direction into the laterally extending trough 13.

Figure 7:
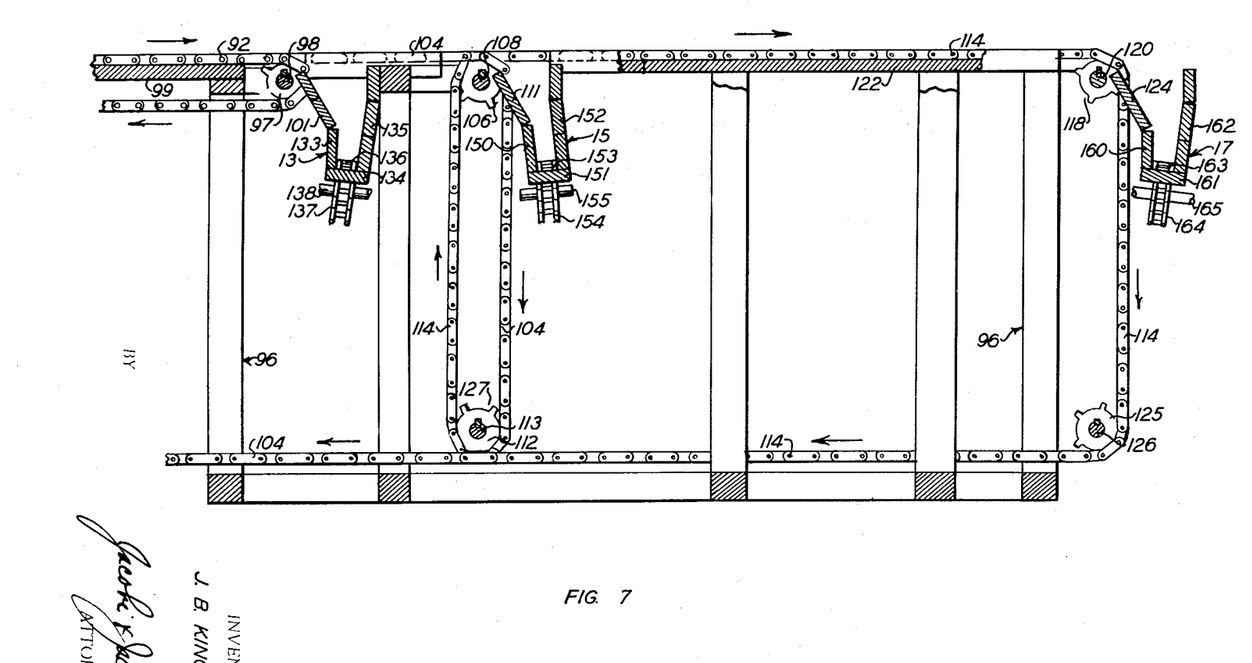
Fig. 7, a sectional view on the line 7—7 of Fig. 2, showing the conveyor means for separating boards according to length as well as the laterally extending conveyor troughs for receiving and removing boards separated according to length.

Disposed outwardly of conveyor chains 92 and 93 are conveyor chains 104 and 105 which are carried at one end by sprockets, not shown, fixed to shaft 95 and at their opposite ends by sprockets 106 and 107 respectively, mounted on shaft 108 supported on frame 96. The upper run of chain 104 is supported on a rail 109 and the upper run of chain 105 is supported on a rail 110.

Chains 104 and 105 are so spaced as to receive boards from the trimming saws 71 and 72 and the inclined ramp 91 of intermediate length and also of the longest length intended to be accommodated by the apparatus. At the delivery ends of the chain 104 and 105 an inclined ramp 111 is provided having notches 112 and 113 to receive the sprockets 106 and 107 respectively together with the chains 104 and 105 carried thereby, boards of intermediate length from chains 104 and 105 being deposited on ramp 111 to move downwardly in an edgewise direction into laterally extending conveyor trough 15. Chains 104 and 105 are endless and pass downwardly from sprockets 105 and 107 around sprockets 112 mounted on a shaft 113 which in turn is rotatably supported on frame 96. The opposite ends of chains 104 and 105 pass over similar sprockets and upwardly to the sprockets carried by shaft 95.

Disposed outwardly of chains 104 and 105 are conveyor chains 114 and 115 trained at one end over sprockets 116 and 117 respectively fixed to shaft 108 and at their opposite ends over sprockets 118 and 119 respectively fixed to shaft 120 journaled in bearings 121 supported on frame 96. The upper run of chain 114 is supported by a rail 122 and the upper run of chain 115 is supported by a rail 123. Adjacent to the delivery end of chains 114 and 115 an inclined ramp 124 is provided having notches 125 and 126 for receiving the sprockets 118 and 119 respectively and the chains 114 and 115 carried thereby, ramp 124 serving to receive boards delivered by chains 114 and 115 and direct the same downwardly under the action of gravity in an edgewise direction into the laterally extending conveyor trough 17.

Chains 114 and 115 which are trained over sprockets 118 and 119 on shaft 120 extend downwardly and are trained around sprockets 125 mounted on shaft 126 supported by frame 96, chains 114 and 115 extending rearwardly from sprockets 125 around sprockets 127 mounted on shaft 113 and upwardly to sprockets 116 and 117 mounted on shaft 108.

Conveyor chains 92 and 93, 104 and 105, 114 and 115 are driven by a motor 128 connected by a chain or other suitable driving means 129 with shaft 108. Since shaft 108 carries sprockets 106 and 107 as well as sprockets 116 and 117 rotation of this shaft by the motor 128 serves to directly drive chains 104 and 105 as well as chains 114 and 115. Also provided on the shaft 108 is a sprocket 130 engaged by a chain or other suitable driving element 131 which in turn engages a sprocket 132 mounted on shaft 98. It will therefore be seen that rotation of the shaft 98 from the shaft 108 and motor 128 serves to drive the conveyor chains 92 and 93.

It will thus be seen that with the above described conveying and sorting apparatus boards of short, intermediate and long lengths will be delivered from the conveyor chains 37 and 50 to the inclined ramps 91 down which such boards will move onto the conveyor chains 92 and 93, the boards of shortest length engaging only chains 92 and 93 while the boards of intermediate and long length will engage both chains 92 and 93 and chains 104 and 105. From chains 92 and 93 the boards of shortest length will be delivered to inclined ramp 101 from which such boards will move downwardly into laterally extending conveyor trough 13. Boards of intermediate length will be delivered from chains 104 and 105 to the downwardly inclined ramp 111 from which the same will move into laterally extending conveyor trough 15 and the boards of the longest length carried by conveyor chains 104 and 105 will be delivered to conveyor chains 114 and 115. From the later chains the boards of longest length will be discharged onto the downwardly inclined ramp 124 from which such boards will move into the laterally extending conveyor trough 17.

The above described mechanism serves to sort and separate the boards according to length and deposit the same in the appropriate laterally extending conveyor troughs from which the same will be ejected and deposited in bins according to the width of the boards. The trough conveyor mechanism and mechanism for ejecting boards therefrom according to width will now be described.

As best shown in Figs. 7 and 10 laterally extending conveyor trough 13 is provided with a front wall 133 immediately below the inclined ramp 101, a bottom wall 134 and a rear wall 135, this rear wall being inclined slightly away from front wall 133 with the bottom wall 134 substantially at right angles to the rear wall 135. Disposed within the trough 133 and having its upper run supported by bottom wall 134 is a conveyor chain 136. Chain 136 may be carried at one end by a sprocket 137 mounted on a shaft 138 and at its outer end by a sprocket 139 mounted on a shaft 140 journaled in bearings 141 mounted on frame 96.

As best shown in Figs. 2, 3, 12 and 13 means is provided to orient a board in the trough 13 and insure that the same is disposed on edge and resting against the rear wall 135. This means may conveniently comprise an arm 142 pivotally mounted at 143 on a bracket 144 secured to the front wall 133 of the trough 13. The inner end of the arm 142 is beveled at 145 and such beveled end is normally urged into engagement with the inner surface of the rear wall 135 by a tension spring 146 connected to the opposite end 147 of the arm 142 and at 148 to the bracket 144.

With particular reference to Fig. 12 it will be seen that a board 149 moving along the trough 13 with the lower edge thereof in engagement with the conveyor chain 136 will engage the beveled end 145 of the arm 142 and cam the same outwardly against the action of tension spring 146. This operation served to force the board 149 rearwardly into engagement with the inner surface of the rear wall 135 of the trough 13. Thereafter the board 149 will remain in engagement with such rear wall 135 because of the rearward inclination thereof, and until the board 149 is ejected from the trough 13 by a mechanism to be later described. The relationship and position occupied by the board 149 in the trough 13 is best shown in Figs. 12 and 13, wherein the board 149 is shown in engagement with the inner surface of the rear wall 135 and the beveled end 145 of the arm 142, the lower edge of the board 149 engaging and being moved along by the conveyor chain 136 supported by the bottom wall 134 of the trough 13.

Figure 3:
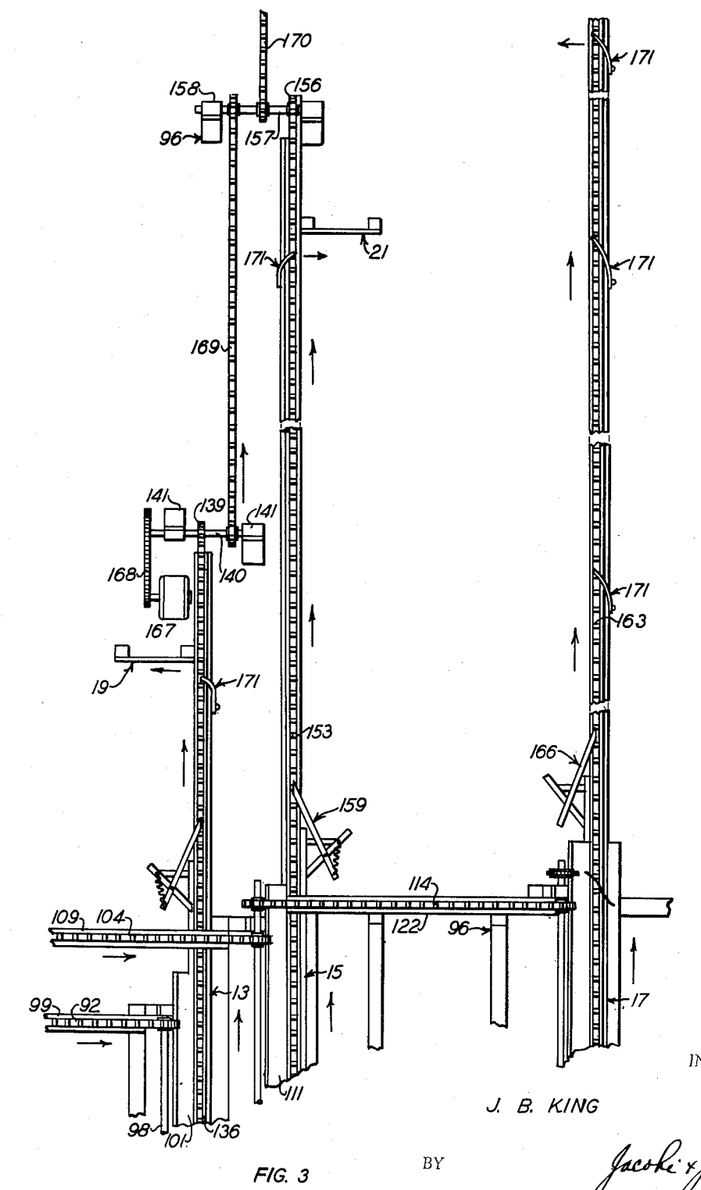
Fig. 3, a fragmentary top plan view showing the portion of the apparatus which serves to separate boards according to width and deposit the same in stacks.

With particular reference to Figs. 2, 3 and 7 it will be seen that the laterally extending conveyor trough 15 is provided with a front wall 150 immediately below the inclined ramp 111, a bottom wall 151 and a rear wall 152. It will be noted that in this instance the inner wall 150 and rear wall 152 are inclined slightly from the vertical and toward the inclined ramp 111 in order that boards received in the trough 15 will occupy an edgewise position at a slight inclination and in engagement with the inner surface of the front wall 150. The bottom wall 151 serves to support the upper run of a conveyor chain 153, one end of which is received over a sprocket 154 carried by a shaft 155 and the outer end of chain 153 being trained over a sprocket 156 mounted on a shaft 157 journaled in bearings 158 carried by frame 96. Suitable orienting means 159 similar to that described above in connection with conveyor trough 13 is provided for insuring that boards received in trough 15 engage and move along the front wall 150.

Laterally extending feed through 17 is provided with a front wall 160, a bottom wall 161 and a rear wall 162 inclined from the vertical away from ramp 124 in a manner similar to rear wall 135 of trough 13, the structure of which was described above. Bottom wall 161 serves to support the upper run of a conveyor chain 163, one end of which is received over a sprocket 164 mounted on a shaft 165, the opposite end of chain 163 being supported by a sprocket and shaft not shown in the drawing. An orienting means 166 similar to that described above in connection with trough 13 is provided in order to insure that boards moving on edge along trough 17 will engage the inner surface of the rear wall 162.

Conveyor chain 136 is driven by a motor 167 connected by a chain or other suitable driving means 168 with the shaft 140, this shaft in turn being connected by a chain or other suitable driving means 169 with the shaft 157 which serves to drive conveyor chain 153. Shaft 157 is connected by a chain or other suitable driving means 170 with the shaft which supports the outer end of chain 163 and thus drives the same.

It will therefore be seen that operation of the motor 167 serves to drive the conveyor chains 136, 153 and 163 and to convey boards in edgewise position along troughs 13, 15 and 17 as such boards are deposited therein. The mechanism for ejecting boards from the troughs 13, 15 and 17 in accordance with the widths of such boards will now be described.

Figures 14, 15, 16, 17:
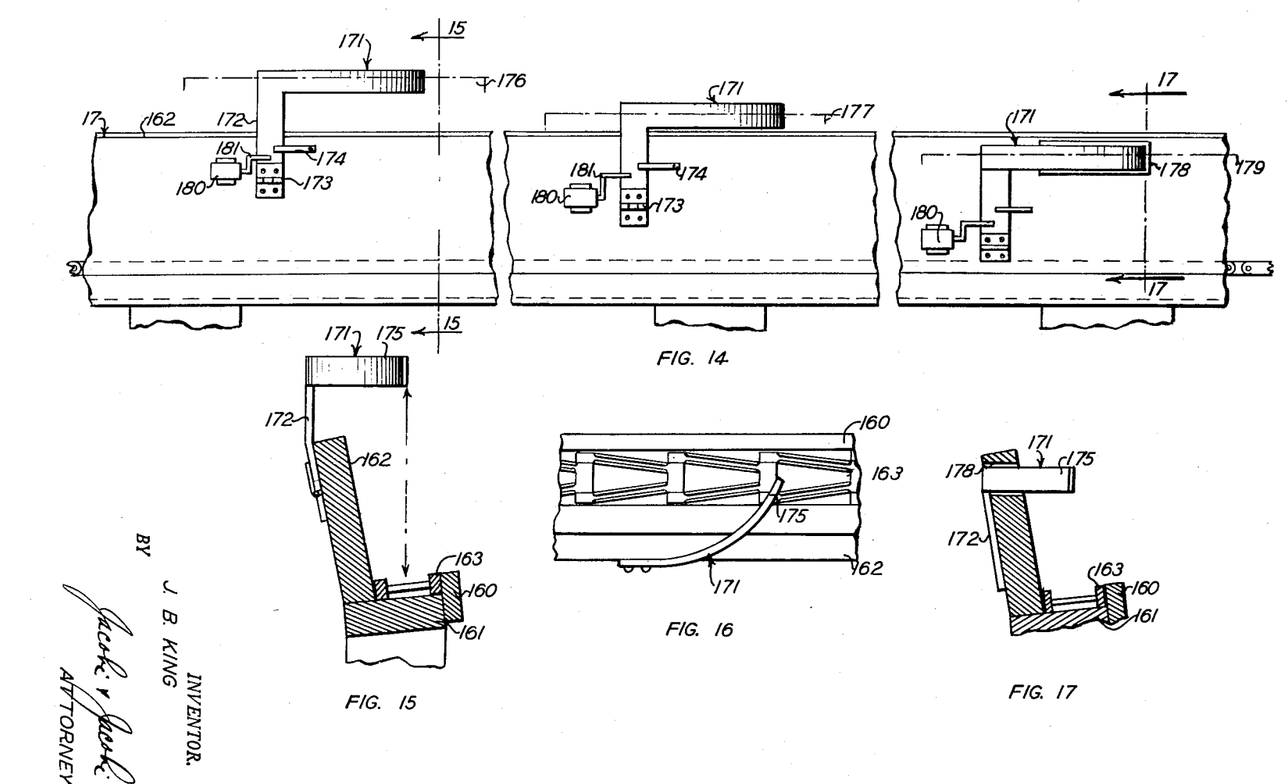
Fig. 14, sheet 7, a fragmentary elevational view showing the means associated with the laterally extending conveyor troughs for engaging and ejecting boards therefrom according to width.
Fig. 15, a sectional detail view on the line 15—15 of Fig. 14, showing the ejector means for engaging a board of greatest width.
Fig. 16, a fragmentary top plan view showing the ejector means associated with the laterally extending conveyor troughs.
Fig. 17, a sectional detail view on the line 17—17 of Fig. 14 showing the ejector means for engaging a board of least width.

With particular reference to Figs. 3 and 14 to 17 inclusive the mechanism for ejecting boards from the troughs 13, 15 and 17 may well comprise ejector fingers 171 mounted on the rear walls 135 and 162 of the troughs 13 and 17 respectively and on the inner wall 150 of the trough 15. In Fig. 14, three such fingers 171 are shown mounted on the rear wall 162 of the trough 17 with the finger 171 having a portion 172 thereof pivotally mounted at 173 on the wall 162. The finger 171 is normally urged toward the wall 162 as viewed in Figs. 14 and 15 by a leaf spring or other suitable means 174, the purpose of which will presently appear. Finger 172 is provided with a curved portion 175 which projects over the trough 17 and into the path of movement of boards moving therealong. As shown in Fig. 14, the left hand finger 171 is disposed substantially above the upper edge of rear wall 162 and the curved portion 175 of the finger 171 is engaged by a board 176 of greatest width passing along the trough 17 while the intermediate finger 171 shown in Fig. 14 is disposed adjacent the upper edge of wall 162, the portion 175 of this intermediate finger 171 serving to engage a board 177 of intermediate width. The right hand finger 171 shown in Fig. 14 is disposed at a lower elevation, the curved portion 175 extending through an opening 178 in the rear wall 162 of the trough 17 and serving to engage a relatively narrow board 179 moving along the trough.

Engagement of the end of board 176 with the curved portion 175 of the finger 171 serves to cam such boards outwardly away from the rear wall 162 of the trough 17 and to eject such boards from the trough and into the bin provided by the partition 22. It will therefore, be seen that all boards of the same or greater width than the board 176 moving along the trough 17 will engage the first finger 171 and be ejected from the trough. Boards of intermediate and narrow widths, such as 177 and 179 will move beneath the curved portion 175 of the left hand finger 171 without contacting the same and board 177 will engage the curved portion 175 of intermediate finger 171 to be ejected from the trough 17 and into the bin formed by partition 23 while the narrow board 179 will pass beneath the curved portion 175 of intermediate finger 171 and will engage the curved portion 175 of the right hand finger 171 to be ejected into the bin formed by partition 24. Thus all boards moving along trough 17 will be ejected therefrom and stacked in an appropriate bin in accordance with the widths of such boards.

Obviously any number of ejector fingers 171 may be provided on the laterally extending conveyor troughs 13, 15 and 17 in order to eject boards of any desired width, and the number shown in the drawing and described in the specification is for illustrative purposes only and is not in anyway to be construed as a limitation.

Since it is desirable that the number of boards received and stacked in any given bin be automatically indicated, means is provided for accomplishing this purpose in the form of a counter 180 of conventional design and mounted on the wall 162 of the trough 17, counter 180 being provided with an actuating arm 181 engaging the portion 172 of the ejector finger 171. Upon engagement of the end of a board 176 with the curved portion 175 of the finger 171, this finger will be cammed outwardly away from the trough 17 against the action of leaf spring 174 which movement will result in actuating the arm 181 to advance the counter 180 one digit. Upon ejection of the board 176 from the trough 17 finger 171 will return to original position under the action of leaf spring 174 and the above described operation will take place each time a board 176 contacts the finger 171 thus actuating the counter 180 to record the total number of boards ejected by this particular finger. Of course, a similar counter 180 and associated mechanism will be provided for each ejector finger 171 and in order to count and provide a record of the boards stacked in each bin.

It will be seen that by the above described invention there has been provided an apparatus for trimming boards to any desired predetermined length, for separating these boards according to such lengths, for sorting and stacking such boards in separate bins according to widths and for recording the number of boards stacked in each bin. The apparatus is relatively simple, requires substantially no skilled labor for the construction and operation thereof and is extremely effective for the purpose intended resulting in the saving of many man hours of labor.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A board trimming, sorting and stacking apparatus comprising in combination a frame, a pair of spaced substantially parallel board supporting ways carried by said frame for adjustment toward and from each other, a groove in the upper surface of each way, a conveyor chain having an upper run received in each groove, spaced board engaging lugs carried by each chain and projecting outwardly therefrom, spaced parallel shafts rotatably mounted on said frame adjacent the ends of said ways, sprockets slidably and non-rotatably mounted on said shafts and engaging said chains whereby upon rotation of said shafts said chains will be driven to feed boards in engagement with said lugs along said ways, a trimming saw rotatably mounted on each way, an arbor slidably and non-rotatably engaging each saw, power means for driving said arbor and saws to trim boards fed thereto by said chains, means for simultaneously moving said ways, chains and saws toward and from each other comprising spaced racks mounted on said frame transversely of and adjacent the ends of said ways, a pinion shaft rotatably mounted on one of said ways and having spaced pinions engaging said racks, crossed cables trained over pulleys and attached to said ways adjacent the ends thereof whereby upon rotation of said pinion shaft to move the associated way in one direction, said cables will move the other way in the opposite direction to facilitate supporting, feeding and trimming boards to any desired length, means for receiving boards of different lengths from said chains and for depositing such boards in separate laterally extending conveyor troughs according to length, means associated with each trough for ejecting boards therefrom to form stacks in separate bins in accordance with the widths of such boards and means for counting and indicating the number of boards in each bin.

2. A board trimming, sorting and stacking apparatus comprising in combination a frame, a pair of spaced substantially parallel board supporting ways carried by said frame for adjustment toward and from each other, a conveyor chain having an upper run supported by each way, spaced board engaging lugs carried by each chain and projecting outwardly therefrom, spaced parallel shafts rotatably mounted on said frame adjacent the ends of said ways, sprockets slidably and non-rotatably mounted on said shafts and engaging said chains whereby upon rotation of said shafts said chains will be driven to feed boards in engagement with said lugs along said ways, a trimming saw rotatably mounted on each way, an arbor slidably and non-rotatably engaging each saw, power means for driving said arbor and saws to trim boards fed thereto by said chains, means for simultaneously moving said ways, chains and saws toward and from each other comprising spaced racks mounted on said frame transversely of and adjacent the ends of said ways, a pinion shaft rotatably mounted on one of said ways and having spaced pinions engaging said racks, crossed cables trained over pulleys and attached to said ways adjacent the ends thereof whereby upon rotation of said pinion shaft to move the associated way in one direction, said cables will move the other way in the opposite direction to facilitate supporting, feeding and trimming boards to any desired length, means for receiving boards of different lengths from said chains and for depositing such boards in separate laterally extending conveyor troughs according to length, means associated with each trough for ejecting boards therefrom to form stacks in separate bins in accordance with the widths of such boards and means for counting and indicating the number of boards in each bin.

3. A board trimming, sorting and stacking apparatus comprising in combination a frame, a pair of spaced substantially parallel board supporting ways carried by said frame for adjustment toward and from each other, a conveyor chain having an upper run supported by each way, board engaging means carried by each chain, and spaced parallel shafts rotatably mounted on said frame adjacent the ends of said ways, sprockets slidably and non-rotatably mounted on said shafts and engaging said chains whereby upon rotation of said shafts said chains will be driven to feed boards along said ways, a trimming saw rotatably mounted on each way, an arbor slidably and non-rotatably engaging each saw, power means for driving said arbor and saws to trim boards fed thereto by said chains, means for simultaneously moving said ways, chains and saws toward and from each other comprising spaced racks mounted on said frame transversely of and adjacent the ends of said ways, a pinion shaft rotatably mounted on one of said ways and having spaced pinions engaging said racks, crossed cables trained over pulleys and attached to said ways adjacent the ends thereof, whereby upon rotation of said pinion shaft to move the associated way in one direction, said cables will move the other way in the opposite direction to facilitate supporting, feeding and trimming boards to any desired length, means for receiving boards of different lengths from said chains and for depositing such boards in separate laterally extending conveyor troughs according to length, means associated with each trough for ejecting boards therefrom to form stacks in separate bins in accordance with the widths of such boards and means for counting and indicating the number of boards in each bin.

4. A board trimming, sorting and stacking apparatus comprising in combination a frame, means on said frame for feeding and trimming boards to any desired length, means for receiving boards from said feeding means and for sorting said boards according to length comprising a first pair of spaced conveyor chains with the upper runs thereof supported on rails, a second pair of conveyor chains with one chain spaced outwardly of one chain of said first pair and with the other chain spaced outwardly of the other chain of said first pair and with the upper runs of said second pair supported on rails in the same horizontal plane as said first pair whereby said first and second pair will receive and convey short, intermediate and long boards with the short boards supported and conveyed only by said first pair of chains, said first pair of chains terminating short of the outer ends of said second pair of chains, a first laterally extending conveyor trough for receiving short boards from said first pair of chains, a second laterally extending conveyor trough for receiving intermediate length boards from said second pair of chains, a third pair of conveyor chains with one chain spaced outwardly of one chain of said second pair and with the other chain spaced outwardly of the other chain of said second pair and with the upper runs of said third pair of chains supported on rails in the same horizontal plane as said first and second pair and with the inner ends of said third pair of chains coextensive with the outer ends of said second pair of chains whereby said third pair of chains will receive and convey long boards from said second pair of chains, a third laterally extending conveyor trough for receiving long boards from said third pair of chains, means for driving said first, second and third pairs of chains at substantially the same speed, means associated with said first, second and third troughs for ejecting boards therefrom to form stacks in separate bins in accordance with the widths of such boards and means for counting and indicating the number of boards in each bin.

5. A board trimming, sorting and stacking apparatus comprising in combination a frame, means on said frame for feeding and trimming boards to any desired length, means for receiving boards from said feeding means and for sorting said boards according to length comprising a first pair of spaced conveyor chains, a second pair of conveyor chains with one chain spaced outwardly of one chain of said first pair and with the other chain spaced outwardly of the other chain of said first pair whereby said first and second pair will receive and convey short, intermediate and long boards with the short boards supported and conveyed only by said first pair of chains, said first pair of chains terminating short of the outer ends of said second pair of chains, a first laterally extending conveyor trough for receiving short boards from said first pair of chains, a second laterally extending conveyor trough for receiving intermediate length boards from said second pair of chains, a third pair of conveyor chains with one chain spaced outwardly of one chain of said second pair and with the other chain spaced outwardly of the other chain of said second pair and with the inner ends of said third pair of chains coextensive with the outer ends of said second pair of chains whereby said third pair of chains will receive and convey long boards from said second pair of chains, a third laterally extending conveyor trough for receiving long boards from said third pair of chains, means for driving said first, second and third pairs of chains at substantially the same speed, means associated with said first, second and third troughs for ejecting boards therefrom to form stacks in separate bins in accordance with the widths of such boards and means for counting and indicating the number of boards in each bin.

6. A board trimming, sorting and stacking apparatus comprising in combination a frame, means on said frame for feeding and trimming boards to any desired length, means for receiving boards from said feeding means and for sorting said boards according to length comprising a first pair of spaced conveyor chains, a second pair of conveyor chains with one chain spaced outwardly of one chain of said first pair and with the other chain spaced outwardly of the other chain of said first pair whereby said first and second pair will receive and convey short, intermediate and long boards with the short boards supported and conveyed only by said first pair of chains, said first pair of chains terminating short of the outer ends of said second pair of chains, a first laterally extending conveyor trough for receiving short boards from said first pair of chains, a second laterally extending conveyor trough for receiving intermediate length boards from said second pair of chains, a third pair of conveyor chains with one chain spaced outwardly of one chain of said second pair and with the other chain spaced outwardly of the other chain of said second pair and with the inner ends of said third pair of chains coextensive with the outer ends of said second pair of chains whereby said third pair of chains will receive and convey long boards from said second pair of chains, a third laterally extending conveyor trough for receiving long boards from said third pairs of chains, means associated with said first, second and third troughs for ejecting boards therefrom to form stacks in separate bins in accordance with the widths of such boards and means for counting and indicating the number of boards in each bin.

7. A board trimming, sorting and stacking apparatus comprising in combination a frame, means on said frame for feeding and trimming boards to any desired length, means for receiving boards of different lengths from said feeding means and for depositing such boards on edge in first, second and third laterally extending conveyor troughs according to length, each of said troughs comprising front bottom and rear walls with the rear walls of said first and third troughs slightly inclined from the vertical in one direction and with the front wall of said second trough slightly inclined from the vertical in the opposite direction, a conveyor chain disposed in each trough and supported by the bottom wall thereof, yieldable means associated with each trough for urging a board therein transversely against the inclined wall and comprising an arm pivotally mounted on said trough, a beveled end on said arm projecting into the path of movement of a board in said trough and resilient means connected to said arm for biasing said beveled end toward said inclined wall whereby said beveled end will resiliently engage a board moving longitudinally of said trough and urge the same against said inclined wall, said board thereafter being held against said inclined wall due to the inclination of said wall and the force of gravity acting on the inclined board, means for ejecting boards from said troughs laterally thereof in accordance with the widths of said boards comprising a plurality of ejector fingers mounted on each trough at different distances above the bottom of said trough with the first finger at the greatest distance and the last finger at the least distance, each finger comprising a portion pivotally mounted on said trough for limited lateral movement with a curved portion projecting into the path of movement of a board in said trough whereby upon engagement of the end of a board moving through said trough with said curved portion said finger will be pivotally moved laterally of said trough and said board will be jected from said trough laterally in the opposite direction, resilient means for returning said finger to original position after ejection of a board, a counter mounted on said trough and an arm engaging said finger to actuate said counter upon piovtal movement of said finger to count and indicate the number of boards ejected by that finger.

8. A board trimming, sorting and stacking apparatus comprising in combination a frame, means on said frame for feeding and trimming boards to any desired length, means for receiving boards of different lengths from said feeding means and for depositing such boards on edge in first, second and third laterally extending conveyor troughs according to length, each of said troughs having a wall, a conveyor chain disposed in each trough, yieldable means associated with each trough for urging a board therein transversely against the inclined wall and comprising an arm pivotally mounted on said trough, a beveled end on said arm projecting into the path of movement of a board in said trough and resilient means connected to said arm for biasing said beveled end toward said inclined wall whereby said beveled end will resiliently engage a board moving longitudinally of said trough and urge the same against said inclined wall, said board thereafter being held against said inclined wall due to the inclination of said wall and the force of gravity acting on the inclined board means for ejecting boards from said troughs laterally thereof in accordance with the widths of said boards comprising a plurality of ejector fingers mounted on each trough at different distances above the bottom of said trough with the first finger at the greatest distance and the last finger at the least distance, each finger comprising a portion pivotally mounted on said trough for limited lateral movement with a curved portion projecting into the path of movement of a board in said trough whereby upon engagement of the end of a board moving through said trough with said curved portion said finger will be pivotally moved laterally of said trough and said board will be ejected from said trough laterally in the opposite direction, resilient means for returning said finger to original position after ejection of a board, a counter mounted on said trough and an arm engaging said finger to actuate said counter upon pivotal movement of said finger to count and indicate the number of boards ejected by that finger.

9. A board trimming, sorting and stacking apparatus comprising in combination a frame, means on said frame for feeding and trimming boards to any desired length, means for receiving boards of different lengths from said feeding means and for depositing such boards on edge in first, second and third laterally extending conveyor troughs according to length, each of said troughs having a wall slightly inclined from the vertical, a conveyor chain disposed in each trough, yieldable means associated with each trough for urging a board therein transversely against the inclined wall, said board thereafter being held against said inclined wall due to the inclination of said wall and the force of gravity acting on the inclined board, means for ejecting boards from said troughs laterally thereof, in accordance with the widths of said boards comprising a plurality of ejector fingers mounted on each trough at different distances above the bottom of said trough with the first finger at the greatest distance and the last finger at the least distance, each finger comprising a portion pivotally mounted on said trough for limited lateral movement with a curved portion projecting into the path of movement of a board in said trough whereby upon engagement of the end of a board moving through said trough with said curved portion said finger will be pivotally moved laterally of said trough and said board will be ejected from said trough laterally in the opposite direction, resilient means for returning said finger to original position after ejection of a board, a counter mounted on said trough and an arm engaging said finger to actuate said counter upon pivotal movement of said finger to count and indicate the number of boards ejected by that finger.

10. A board trimming, sorting and stacking apparatus comprising in combination a frame, means on said frame for feeding and trimming boards to any desired length, means for receiving boards of different lengths from said feeding means and for depositing such boards on edge in first, second and third laterally extending conveyor troughs according to length, each of said troughs having a wall slightly inclined from the vertical, a conveyor chain disposed in each trough, yieldable means associated with each trough for urging a board therein transversely against the inclined wall, said board thereafter being held against said inclined wall due to the inclination of said wall and the force of gravity acting on the inclined board, means for ejecting boards from said troughs laterally thereof, in accordance with the widths of said boards comprising a plurality of ejector fingers mounted on each trough at different distances above the bottom of said trough with the first finger at the greatest distance and the last finger at the least distance, each finger comprising a portion pivotally mounted on said trough for limited lateral movement with a second portion projecting into the path of movement of a board in said trough whereby upon engagement of the end of a board moving through said trough with said second portion said finger will be pivotally moved laterally of said trough and said board will be ejected from said trough laterally in the opposite direction, resilient means for returning said finger to original position after ejection of a board, a counter mounted on said trough and an arm engaging said finger to actuate said counter upon pivotal movement of said finger to count and indicate the number of boards ejected by that finger.

References Cited in the file of this patent

UNITED STATES PATENTS

| | | |
|---|---|---|
| 378,796 | Linderman | Feb. 28, 1888 |
| 1,277,326 | Lohman | Aug. 27, 1918 |
| 1,761,096 | Tower | June 3, 1930 |
| 1,986,427 | Denton | Jan. 1, 1935 |
| 2,501,299 | Anderson | Mar. 21, 1950 |
| 2,600,147 | Wilson | June 10, 1952 |